United States Patent
Koyama et al.

[11] Patent Number: 5,949,503
[45] Date of Patent: Sep. 7, 1999

[54] REFLECTIVE LIQUID CRYSTAL SPATIAL LIGHT MODULATOR AND PROJECTION APPARATUS COMPRISING SAME

[75] Inventors: Motoo Koyama; Hideaki Shimomura, both of Kawasaki, Japan

[73] Assignee: Nikon Corporation, Tokyo, Japan

[21] Appl. No.: 08/668,943

[22] Filed: Jun. 24, 1996

[30] Foreign Application Priority Data

Jun. 22, 1995 [JP] Japan .................................. 7-179369
Apr. 1, 1996 [JP] Japan .................................. 8-101858
Apr. 11, 1996 [JP] Japan .................................. 8-115775

[51] Int. Cl.⁶ .................................................. G02F 1/136
[52] U.S. Cl. .............................. 349/41; 349/201; 349/86; 349/10; 353/37; 353/38; 353/97; 353/122
[58] Field of Search ................................ 349/201, 86, 10; 353/37, 38, 97, 122

[56] References Cited

U.S. PATENT DOCUMENTS

| | | | |
|---|---|---|---|
| 4,251,137 | 2/1981 | Knop et al. | 349/201 |
| 4,389,096 | 6/1983 | Hori et al. | 349/201 |
| 4,729,640 | 3/1988 | Sakata | 349/201 |
| 5,299,289 | 3/1994 | Omae et al. | 349/86 |
| 5,477,351 | 12/1995 | Takahara et al. | 349/86 |

FOREIGN PATENT DOCUMENTS

1-150117  6/1989  Japan .

*Primary Examiner*—William L. Sikes
*Assistant Examiner*—Robert J. Hollingshead
*Attorney, Agent, or Firm*—Klarquist Sparkman Campbell Leigh & Whinston, LLP

[57] ABSTRACT

Reflective spatial light modulators (RSLMs) and projection apparatus employing such RSLMs are disclosed. The RSLM comprises a reflective surface and a superposed light-modulation layer. The reflective surface is configured to have a reflective diffraction optical element or a microfaceted reflective array. Incident light impinging on the RSLM can pass through the light-modulation layer, reflect from the reflective surface, and return through the light-modulation layer to become modulated signal light capable of forming a viewable image if projected onto a screen or other surface. The reflective diffraction optical element or microfaceted reflective array on the reflective surface is operable to cause the signal light to propagate from the RSLM in a different direction than any ghost light reflected from the RSLM. Projection apparatus employing such an RSLM comprise an illumination optical system, a projection optical system that may or may not be coaxial with the illumination optical system, and a stop operable to pass signal light but not ghost light to a screen for viewing. The viewed image has enhanced contrast over the prior art.

22 Claims, 10 Drawing Sheets

REFLECTIVE LIQUID CRYSTAL SPATIAL LIGHT MODULATOR AND PROJECTION APPARATUS COMPRISING SAME

FIELD OF THE INVENTION

This invention pertains to reflective spatial light modulators and projection apparatus that use a reflective spatial light modulator, and especially pertains to projection apparatus that project light, that has been modulated by a reflective spatial light modulator, onto a viewing surface such as a screen.

BACKGROUND OF THE INVENTION

Figure 1:
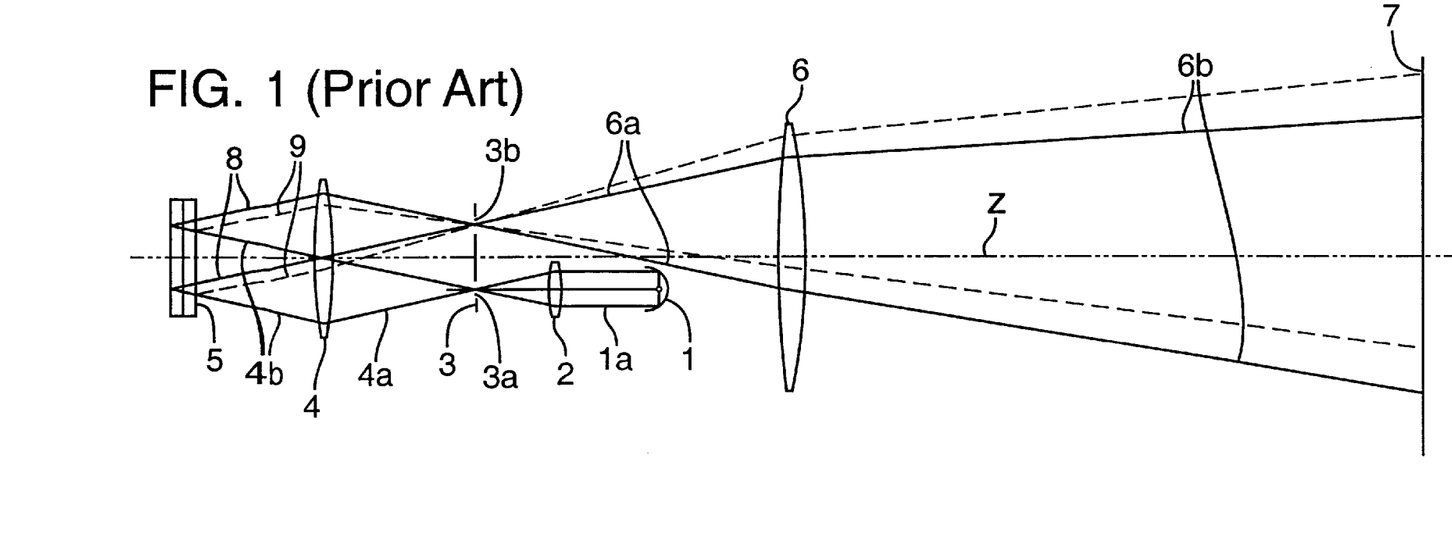
FIG. 1 is a schematic optical diagram of a prior-art projection apparatus including a prior-art reflective spatial light modulator (RSLM).

FIG. 1 depicts a prior-art projection apparatus comprising a light source 1, an illumination lens 2, a stop 3 defining an incident-side aperture 3a and an exit-side aperture 3b, a front lens group 4, a reflective spatial light modulator (RSLM) 5 (such as a "light valve" as known in the art), a rear lens group 6, and a surface ("screen") 7 on which reflected modulated light from the RSLM 5 creates a viewable image. The front lens group 4 and the rear lens group 6 are arranged on an optical axis z and constitute a "projection optical system" of the apparatus. The light source, illumination lens, and incident-side aperture comprise an "illumination optical system" of the apparatus. A parallel illumination light flux 1a, produced by the light source 1, is focused by the illumination lens 2 so as to converge at the incident-side aperture 3a. The front lens group 4 refracts the illumination light flux 4a diverging from the incident-side aperture 3a to produce a substantially parallel incident light flux (rays 4b) that impinge, at an angle to the optical axis z, on the RSLM 5. The RSLM 5 produces, from the incident light flux, a reflected modulated light flux (rays 8) that is refracted by the front lens group 4 to converge at the exit-side aperture 3b. The rear lens group 6 refracts, and thus projects, the modulated light flux (rays 6a) diverging from the exit-side aperture 3b to the screen 7 or analogous viewing surface that forms a viewable image from the modulated light flux (rays 6b).

Figure 2:
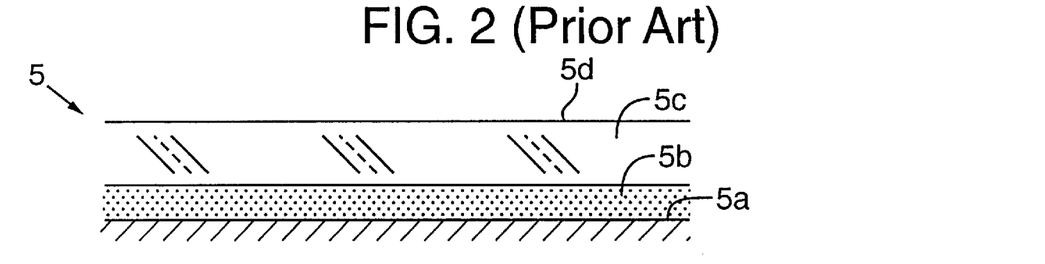
FIG. 2 is a schematic sectional view of a prior-art RSLM, such as that used in FIG. 1.

A schematic cross section of a representative RSLM 5 according to the prior art, shown in FIG. 2, comprises a light-modulation layer 5b situated between a reflective surface 5a and a plane-parallel transparent layer 5c. The reflective surface 5a is substantially planar in profile and is parallel to the transparent layer 5c. The transparent layer 5c has a substantially planar surface 5d.

Figure 3:
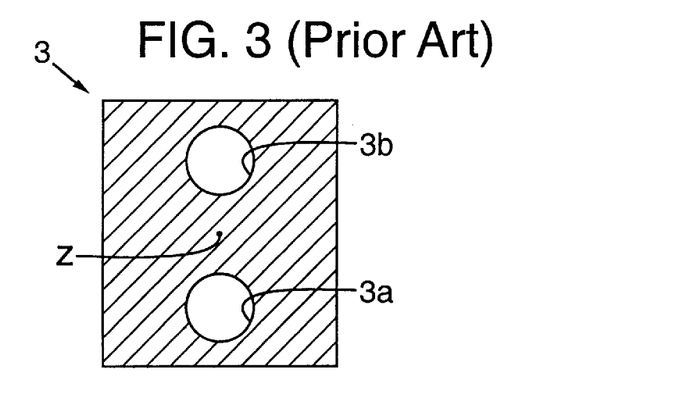
FIG. 3 is a plan view of an aperture stop as used in the prior-art projection apparatus of FIG. 1.

FIG. 3 depicts details of the stop 3 utilized in the apparatus of FIG. 1. The stop 3 comprises a light-shielding body that defines an incident-side aperture 3a, through which the illumination light flux passes to the RSLM 5, and an exit-side aperture 3b through which the modulated light flux passes to the screen 7. Both apertures 3a, 3b are arranged symmetrically around the optical axis z (extending normal to the plane of the page) of the lens groups 4, 6.

Referring further to FIG. 2, the light-modulation layer 5b of the RSLM 5 is disposed closer than the reflective surface 5a to the projection optical system 4, 6. Also, the transparent layer 5c, which can be protective glass or the like, is situated closer to the projection optical system 4, 6 than the light-modulation layer 5b.

FIG. 1 depicts two categories of light reflected from the RSLM 5. "Signal" light (rays 8, 6a, 6b denoted by solid lines) represents light that, after having passed as incident light through the transparent layer 5c and the light-modulation layer 5b, reflects from the reflective surface 5a and passes again through the light-modulation layer 5b and the transparent layer 5a. "Ghost" light (indicated by dashed lines, e.g., rays 9) represents light that, as incident light, is reflected from the surface 5d of the transparent layer 5c without penetrating to the light-modulation layer 5b or the reflective surface 5a. Since the reflective surface 5a and the transparent layer 5c are planar and parallel to each other, the signal light 8 and the ghost light 9 are parallel to each other between the RSLM 5 and the front lens group 4. The front lens group 4 causes the signal light 8 and the ghost light 9 to converge at the same point at the exit-side aperture 3b. Unfortunately, however, because the signal light and ghost light both pass through the exit-side aperture 3b, both propagate to the screen 7, where the ghost light diminishes image contrast.

A conventional RSLM 5 that utilizes scattering, such as an RSLM employing a polymer dispersion-type liquid crystal (PDLC) element as the light-modulation layer, requires that incident light be at an angle of incidence significantly greater than zero degrees to adequately separate "exit" light (i.e., light propagating from the RSLM) from incident light (i.e., light propagating to the RSLM). Unfortunately, this can complicate the construction of a projection apparatus employing the RSLM.

SUMMARY OF THE INVENTION

The foregoing shortcomings of the prior art are solved by the present invention, which provides, inter alia, an RSLM, comprising a reflective layer and a light-modulation layer superposed on the reflective layer, operable to direct reflected modulated "signal light" in a different direction, relative to the plane of the RSLM, from reflected ghost light, thereby allowing the ghost light to be selectively blocked from reaching the screen.

To effect such routing of signal light relative to ghost light, an RSLM according to the present invention preferably comprises either a "reflective diffraction optical element" or a "microfaceted reflective array" situated on the reflective surface.

The reflective diffraction optical element causes diffraction of modulated light reflecting from the reflective surface. I.e., the reflective diffraction optical element produces various diffraction orders of reflected modulated light. Zeroth-order diffracted light is preferably cancelled by interference and thus does not propagate from the RSLM. Higher orders of diffracted light propagate from the RSLM in different directions than the ghost light.

According to a first representative embodiment, the reflective diffraction optical element comprises an array of phase shifters on the reflective surface. Each phase shifter preferably imparts a phase shift of about $\lambda/2$ to modulated light of wavelength $\lambda$ passing through the phase shifter, reflecting from the reflective surface, and returning through the phase shifter.

According to a second representative embodiment, the reflective diffraction optical element comprises an array of indentations and protrusions arranged on the reflective surface. The indentations and protrusions are preferably configured to impart a phase shift of about $\lambda/2$ to modulated light of wavelength $\lambda$ reflecting from an indentation compared to light of that wavelength reflecting from a protrusion.

Various embodiments of a microfaceted reflective array are possible, including but not necessarily limited to, regular arrays of convex pyramids, concave pyramids, and combinations of convex and concave pyramids; convex cones, concave cones, or combinations of convex and concave cones; and ridges and valleys.

According to another aspect of the present invention, various projection apparatus are provided that employ an RSLM according to the present invention. Such projection apparatus exhibit simple construction and can produce on a screen or other suitable viewing surface an image, from the RSLM, having excellent contrast without significant degradation of image quality due to ghost light. The apparatus comprises a projection optical system and an illumination optical system. The illumination optical system is operable to provide an illumination light flux, and the projection optical system is operable to project signal light from the RSLM to the viewing surface. The illumination optical system can be either coaxial or not coaxial with the projection optical system. Whenever these systems are coaxial, the illumination light flux preferably impinges normally on the RSLM.

According to a preferred embodiment, the projection optical system comprises, in order from the RSLM side, a first lens group, an exit-side aperture, and a second lens group. Also, according to a preferred embodiment, the illumination optical system comprises an illumination-side aperture situated between the first lens group and the second lens group such that illumination-light flux passes through the illumination-side aperture to be refracted by the first lens group for impingement on the RSLM. The exit-side aperture is preferably situated between the first lens group and the second lens group such that signal-light flux, but substantially no ghost light, passes from the first lens group through the exit-side aperture to be refracted by the second lens group for impingement on a viewing surface ("screen").

Preferably, the illumination-side aperture and the exit-side aperture are both defined by a stop disposed between the first and second lens groups. The exit-side aperture can comprise multiple orifices defined by the stop, depending upon the configuration of the reflective diffraction optical element or the microfaceted reflective array. The stop can operate to block propagation of ghost light therethrough or to allow passage of the ghost light through the illumination-side aperture, not the exit-side aperture, thus preventing the ghost light from impinging on the screen.

Thus, projection apparatus according to the present invention produces an image on the screen that has high contrast and can be simply and conveniently constructed.

Other features and advantages of the present invention can be ascertained by reference to the following detailed description and drawings.

BRIEF DESCRIPTION OF THE DRAWINGS

FIG. 11 also shows specific aspects of such a projection apparatus employing the RSLM of FIG. 12.

DETAILED DESCRIPTION OF PREFERRED EMBODIMENTS

A reflective spatial light modulator (RSLM) according to the present invention typically comprises a modulation layer, a reflective surface, and a transparent layer. The RSLM is operable to produce, from incident light, a reflected modulated "signal light" flux that can be delivered, for example, to a projection apparatus operable to form a viewable image from the signal light on a screen or other suitable viewing surface. Notably, the RSLM is operable to direct the signal light in a direction that is different from any "ghost light" produced by reflection of incident light from the RSLM, thereby allowing the ghost light to be blocked and thus prevented from reaching the signal-light image on the screen.

As used herein, "signal light" produced by a RSLM is light that has, after entering the RSLM as incident light, passes through the light-modulation layer, reflects from the reflective surface, and passes again through the light-modulation layer. Modulation encodes information in the light that enables the signal light to produce a viewable image when the signal light impinges on a screen or other suitable surface.

As stated above, a notable aspect of an RSLM according to the present invention is the ability of the RSLM to direct signal light in a direction that is different from any "ghost light" produced by reflection of incident light from the RSLM. RSLMs according to the present invention comprise any of various features that confer such ability. One feature is termed a "reflective diffraction optical element" as described in detail below. An alternative feature providing such ability is a "microfaceted" reflective array, as also described in detail herein, having any of various geometries.

Figure 4:
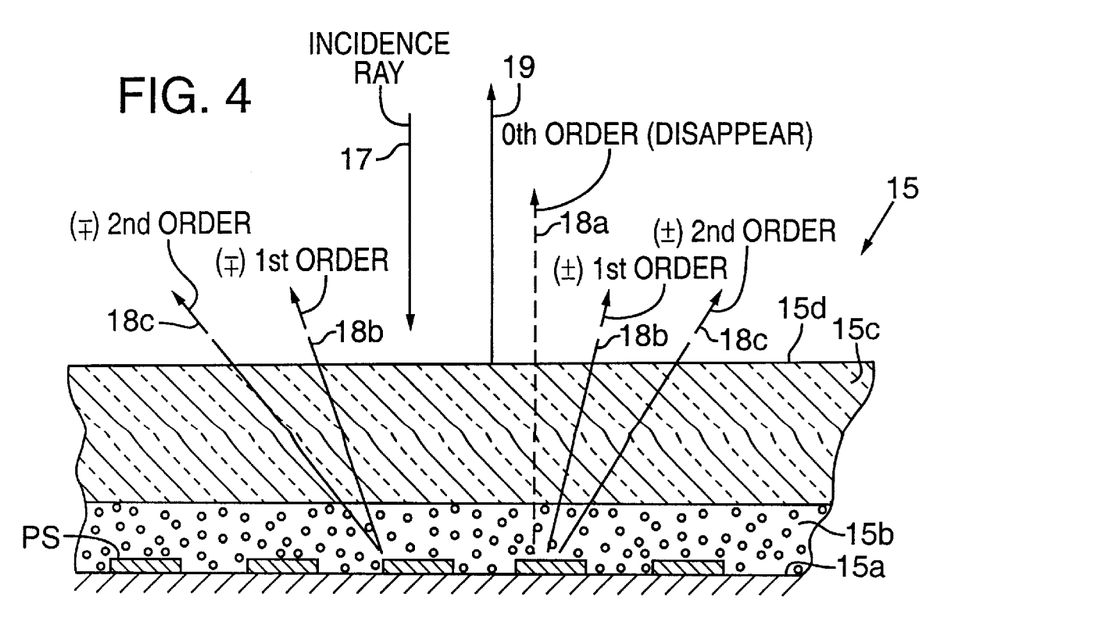
FIG. 4 is a schematic sectional view of a first example embodiment of an RSLM, according to the present invention, provided with a reflective surface having a phase-shifter array.
Figure 5:
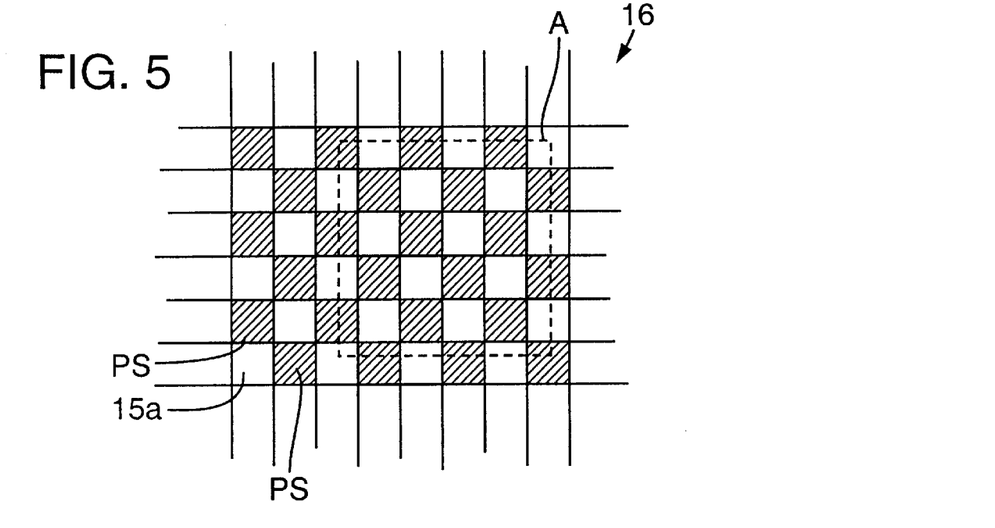
FIG. 5 is a schematic plan view of the phase-shifter array of the RSLM of FIG. 4.

Turning first to RSLMs according to the present invention having a reflective diffraction optical element, a first example embodiment 15 of such an RSLM is depicted schematically in cross section in FIG. 4. The RSLM 15 comprises a reflective surface 15a, a light-modulation layer 15b superposed on the reflective surface 15a, and a transparent layer 15c superposed on the light-modulation layer 15b. The transparent layer 15c has a planar surface 15d that can be regarded, for reference purposes, as a plane "defined" by the RSLM. Situated on the reflective surface 15a is a regular array of phase shifters PS. The array is preferably a checkerboard pattern as schematically depicted in FIG. 5, wherein the entire array comprises a "reflective diffraction optical element" 16. In FIG. 5, the area delineated by the dashed line A corresponds to one picture element (i.e., one pixel). The area of and spacing between each phase shifter PS is sufficient to cause substantial diffraction of incident light as the light reflects from the reflective diffraction optical element 16.

The thickness dimension of each phase shifter PS is preferably sufficient to impart a phase difference of approximately ¼ wavelength to incident light when such light passes once through the thickness dimension. Thus, incident light of wavelength $\lambda$ passing through the thickness dimension of a phase shifter PS, then reflecting from the reflective surface 15a, and then returning through the thickness dimension of the phase shifter PS undergoes a shift in phase of about $\lambda/2$ compared to light reflected from the reflective surface 15a without passing at all through a phase shifter PS.

The RSLM 15, due to the presence of the reflective diffraction optical element 16, is operable to produce, upon impingement thereon of incident light (ray 17), various diffraction orders (e.g., rays 18a, 18b, 18c) of reflected light. In FIG. 4, ghost light (ray 19) reflects from the surface 15d at an angle of reflection equal to the angle of incidence. Since some of the 0th (zeroth) order (ray 18a) of reflected modulated signal light is phase inverted (i.e., by 180°) by action of the phase shifters PS and some is not, a destructive interference involving the 0th-order light results in substantial elimination of all the 0th-order light. I.e., modulated light reflected from portions of the reflective surface 15a lacking a superposed phase shifter PS (i.e., reflected modulated light that is not phase shifted) interferes with modulated light reflected from portions of the reflective surface 15c having a superposed phase shifter PS (i.e., light that has been phase shifted by 180°). However, first-order and higher-order diffracted light, modulated by the RSLM, are not cancelled but rather allowed to propagate as modulated "signal" light.

Referring further to FIG. 4, the light-modulation layer 15b is preferably formed of a polymer dispersion-type liquid crystal layered on the reflective surface 15a, thereby sandwiching the multiple phase shifters PS between the reflective surface 15a and the light-modulation layer 15b. The transparent layer 15c is preferably glass. Although not shown in FIG. 4, the RSLM can also include any of various other functional films such as (but not limited to) a photoconductive layer, a transparent conductor (ITO) film, a light-shield layer, or an anti-reflective film as necessary or desired. As incident or reflected light passes through the light-modulation layer 15b, the light is modulated with video information according to video signals inputted into the light-modulation layer 15b.

The phase shifters PS can be made of any of various materials having a different refractive index from the light-modulation layer 15b, and with which absorption is not a problem at the wavelength being used. For example, the light-modulation layer can be a PDLC (polymer diffusion liquid crystal) in which the main polymer ingredient is an epoxy resin. The refractive index $n_1$ (d-line) of PDLC is approximately 1.524. With such a light-modulation layer used with light in the visible spectrum, a silicon nitride, for example, (in which the main ingredient is $Si_3N_4$) having a refractive index of around 2 can be used as the material for the phase shifters. The refractive index $n_2$ of the silicon nitride can be set within a range of approximately 1.8 to 2.0 by means of process control.

The refractive indices $n_1$ and $n_2$ and the thickness d of a $\lambda/4$ phase shifter have the following quantitative relationship:

$$n_2 \cdot d - n_1 \cdot d = \lambda(\tfrac{1}{4}+N) \quad (1)$$

wherein N is an integer greater than zero (when $n_1 < n_2$), and $\lambda$ is the wavelength of light being used. Thus, the thickness d of a $\lambda/4$ phase shifter is expressed by equation (2), below:

$$d = \lambda(\tfrac{1}{4}+N)/(n_2-n_1) \quad (2)$$

Figure 6:
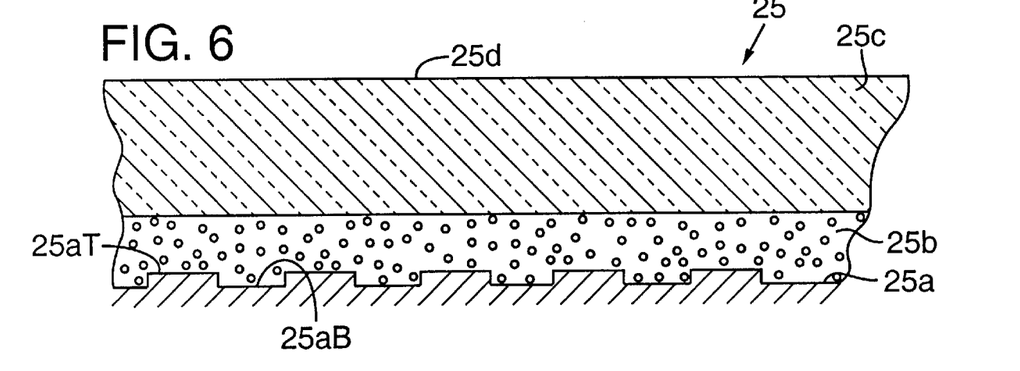
FIG. 6 is a schematic sectional view of a second example embodiment of an RSLM, according to the present invention, provided with an alternative phase-shifting configuration.

A second example embodiment 25 of an RSLM according to the present invention having a reflective diffraction optical element is shown in FIG. 6. The RSLM 25 is provided with an alternative phase-shifting configuration and is depicted schematically in FIG. 6 in cross section. The FIG. 6 embodiment is structured similarly to the FIG. 4 embodiment in that the FIG. 6 embodiment comprises a reflective surface 25a, a light-modulation layer 25b, a transparent layer 25c, and a planar surface 25d. Instead of using discrete phase shifters as utilized in the FIG. 4 embodiment, the RSLM 25 of FIG. 6 utilizes a regular array (e.g., in a checkerboard pattern) of protrusions 25aT and indentations 25aB on the reflective surface 25a that effect phase shifting.

Further with respect to FIG. 6, the indentations 25aB and protrusions 25aT collectively comprise a reflective diffraction optical element. Incident light can reflect from the indentations 25aB and from the protrusions 25aT; however, with a wavelength $\lambda$ of incident light, the difference between the phase of modulated light reflected by an indentation 25aB and the phase of modulated light reflected by a protrusion 25aT is approximately $\lambda/2$.

The size of the protrusions 25aT and indentations 25aB is appropriate to cause substantial diffraction of light reflecting therefrom. As in the FIG. 4 embodiment, 0th-order light is effectively "cancelled" and thus eliminated.

Even though the phase shifters PS in the FIG. 4 embodiment and the indentations 25aB and protrusions 25aT in the FIG. 6 embodiment are shown having a square shape, the phase shifters PS, indentations 25aB, and protrusions 25aT are not limited to a square shape. Furthermore, the phase shifters PS or indentations 25aB and protrusions 25aT are not necessarily arrayed in a checkerboard pattern; as long as they are regularly arranged on the reflective surface with some periodicity, a reflective diffraction optical element is formed thereby that effectively cancels 0th-order reflected modulated light.

It is noted that binary optics comprising phase shifters or indentations and protrusions with multi-stage thicknesses can be used instead of the phase shifters PS used in the FIG. 4 embodiment or the indentations 25aB and protrusions 25aT used in the FIG. 6 embodiment. Making such a substitution can result in a specific higher (non-zero) order of diffracted light being intensified relative to other higher orders, making it possible to further improve the efficiency of the use of that light. It is also possible to further improve use efficiency of the light by having the format of the multi-stage binary optics be a continuous format rather than a multi-stage, i.e., non-continuous, format.

The phase shifters PS of the FIG. 4 embodiment and the undulating structure of the reflective surface 25a of the FIG. 6 embodiment can be manufactured by, e.g., a photolithographic method, or other suitable method.

Figure 7:
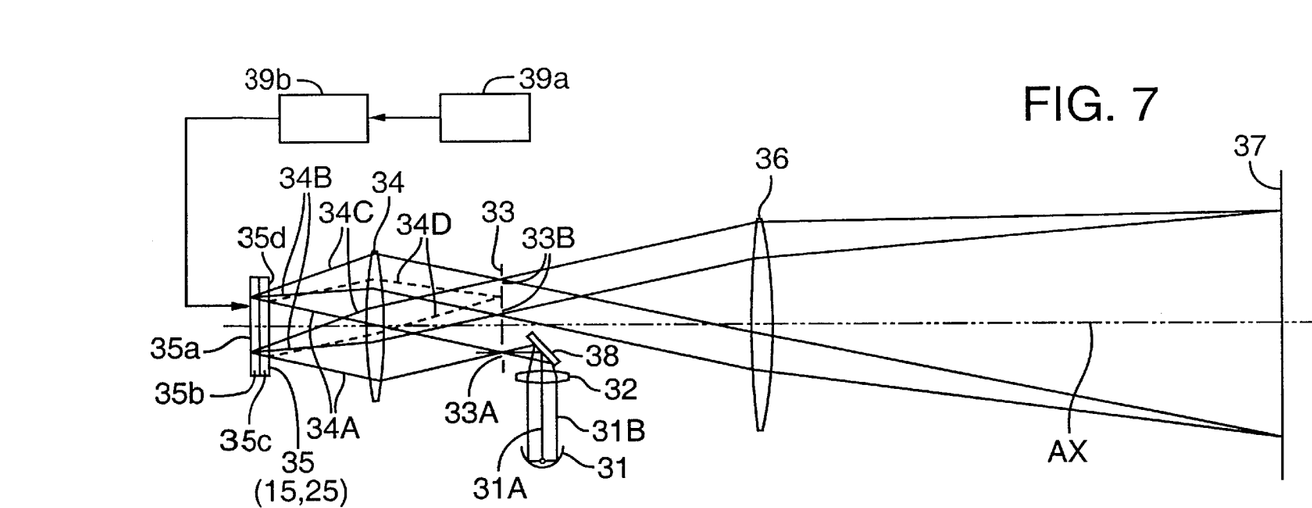
FIG. 7 is a schematic optical diagram of a first representative embodiment of a projection apparatus according to the present invention utilizing an RSLM as shown, e.g., in FIG. 4 or 6.
Figure 8:
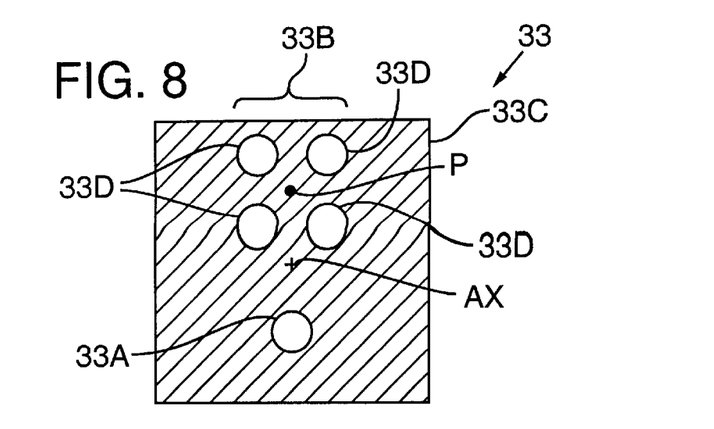
FIG. 8 is a plan view of a stop as employed in the projection apparatus of FIG. 7, wherein the light axis AX of the projection optical system extends normal to the plane of the page.

FIG. 7 schematically depicts a first representative embodiment of a projection apparatus according to the present invention employing, for example, the FIG. 4 embodiment of an RSLM, or alternatively the FIG. 6 embodiment of an RSLM. In FIG. 7, a light source 31 provides a nearly parallel illumination light flux (rays 31B). The light source 31 is preferably a reflector type that is arranged on a light axis 31A on which an illumination lens 32 is situated. The illumination lens 32 converges the illumination light flux, which reflects from a prism 38, to form a light-source image. An illumination-light aperture 33A is defined by a stop 33 situated where the light-source image is formed. As seen in FIG. 8, the illumination light aperture 33A is defined, preferably as a circular orifice, by a planar light-shielding body 33C. A first lens group 34 refracts light from the light-source image, downstream of the illumination-light aperture 33A, into a parallel illumination light flux (rays 34A) for impingement on an RSLM 35 (according to, for example, FIG. 4 or FIG. 6). The RSLM 35 is situated on a light axis AX of the projection optical system.

In FIG. 7, the light source 31, illumination lens 32, prism 38, and illumination-light aperture 33A comprise an "illumination optical system" of the apparatus that operates to provide illumination light to the RSLM 35.

Further with respect to FIG. 7, the light-modulation layer 35b of the RSLM 35 is driven using a video data input 39a and a controller 39b collectively comprising electronic circuitry, generally as known in the art, operable to provide video image information sufficient to cause the RSLM to produce a modulated signal light.

The video data input 39a can be operable to read video image information provided from a source (not shown) such as, for example, a magnetic recording medium (e.g., floppy disk or video tape), an optical recording medium (e.g., photo CD or MO (optical-magnetic recording medium)), or electrical recording medium (e.g., IC card). The video data input 39a can be constructed as a separate unit from the projection optical apparatus and electrically connected thereto by an appropriate cable or other electrical connection means.

As mentioned above, the RSLM 35 comprises a reflective diffraction optical element as shown, for example, in either FIG. 4 or FIG. 6. The RSLM can also include a so-called optical write format device (not shown), wherein video-image information that is input to the RSLM is displayed on a video-display means, e.g., a CRT or LCD. Light from the video image displayed on such a video-display means is directed to the RSLM which performs modulation of incident light.

Continuing further with FIG. 7, higher orders of modulated diffracted signal light (rays 34B, 34C) from the RSLM 35 are focused by the first lens group 34 to form one or more images. Exit-side apertures 33B are situated at this image-formation position. Signal light passing through the exit-side apertures 33B is refracted by a second lens group 36 for projection onto a screen 37 situated on the light axis AX. Thus, a light/dark pattern corresponding to the light-modulation action of the RSLM 35 based on the video information input to the RSLM 35 is formed as a video image on the screen 37.

Ghost light (rays 34D) reflected from the planar surface 35d propagates from the RSLM 35 in a direction that is different from that of the signal light. Thus, the ghost light can be effectively blocked by the stop 33 and does not propagate to the second lens group 36.

Referring to FIG. 8, the exit-side apertures 33B preferably comprise multiple orifices 33D (four are shown) defined by an opaque planar light-shielding body 33C symmetrically about a point P. The point P is the convergence point for the ghost light (rays 34D).

As discussed above with regard to a prior-art projection apparatus as depicted, for example, in FIG. 1 and that uses a conventional RSLM, the modulated signal light and the ghost light reach the aperture stop along paths that are nearly the same. As a result, the ghost light propagates together with the signal light to the screen where the ghost light causes deterioration of image contrast.

With the projection apparatus of FIG. 7, in contrast, the signal light is modulated higher-order diffracted light produced by the reflective diffraction optical element in the RSLM and propagated in directions different from the direction of propagation of ghost light. Consequently, the signal light can pass through the exit-side apertures 33B to the screen, but the ghost light is blocked at P and thus prevented from propagating to the screen.

In view of the propagation direction of higher-order diffracted signal light from the RSLM of, e.g., FIG. 4 or FIG. 6, relative to ghost light, the RSLM can be employed in a projection apparatus in which the light source is situated coaxially with the projection apparatus. Such a configuration desirably simplifies the construction of the projection apparatus, and simplifies any adjustments of optical components of the projection apparatus that may be required.

Figure 9:
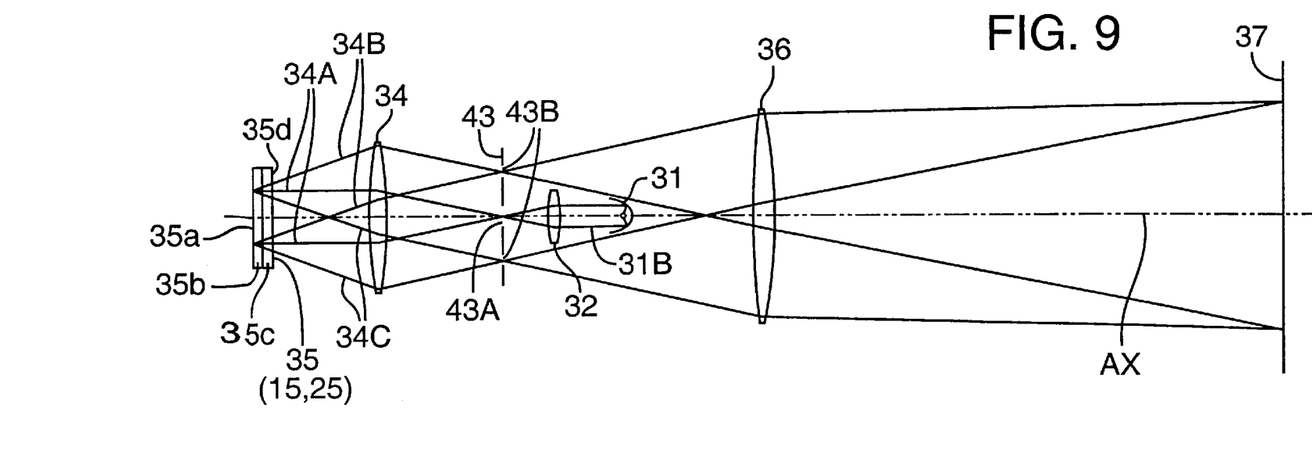
FIG. 9 is a schematic optical diagram of a second representative embodiment of a projection apparatus according to the present invention utilizing an RSLM as shown, e.g., in FIG. 4 or FIG. 6.

Such a "coaxial" embodiment of a projection apparatus according to the present invention is depicted in FIG. 9, in which components that are substantially the same as in FIG. 7 have the same reference designators. The RSLM 35 can be, e.g., as depicted in FIG. 4 or FIG. 6. The apparatus of FIG. 9 includes a stop 43 defining an illumination-light aperture 43A and exit-side apertures 43B as detailed in FIG. 9, viewed along the optical axis AX.

The apparatus of FIG. 9, in contrast to that of FIG. 7 in which the overall structure is asymmetric around the light axis AX (i.e., the illumination optical system and the projection optical system are not coaxial), has an overall structure that is symmetric around the light axis AX (i.e., the illumination optical system and the projection optical system are coaxial). Although not shown in FIG. 9, it will be understood that, as in FIG. 7, an input 39a and a controller 39b are preferably used to operate the RSLM 35.

Continuing further with FIG. 9, a parallel light flux (rays 31B) from the light source 31 (which is situated on the light axis AX) is converged by the illumination lens 32 (similarly situated on the light axis AX) to form an image of the light source. An illumination-light aperture 43A is situated at the position on the light axis AX at which the light-source image is formed. In FIG. 9, the light source 31, the illumination lens 32, and the illumination-light aperture 43A together comprise the "illumination optical system" of the apparatus. The first lens group 34 and the second lens group 36 together comprise the "projection optical system" of the apparatus.

The light passing through the illumination-light aperture 43A is refracted into a parallel light flux (rays 34A) by the first lens group 34. The parallel light flux illuminates the RSLM 35, which is also situated on the light axis AX.

Higher orders of modulated diffracted light (rays 34B, 34C) from the RSLM 35 are refracted by the first lens group 34 to converge at the exit-side apertures 43B and propagate therethrough to the second lens group 36 for projection onto the screen 37 (also situated on the light axis AX).

Figure 10:
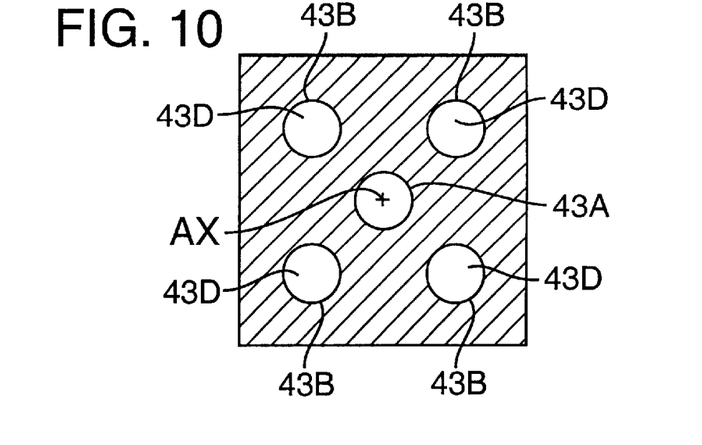
FIG. 10 is a plan view of a stop as employed in the projection apparatus of FIG. 9, wherein the light axis AX of the projection optical system extends normal to the plane of the page.

FIG. 10, detailing the stop 43, shows that the illumination-light aperture 43A is coaxial with the light axis AX, whereas the exit-side apertures 43B comprise multiple orifices 43D arranged equidistantly from each other symmetrically around the light axis AX.

Referring further to FIG. 9, modulated diffracted signal light passes through the orifices 43D and is projected onto the screen 37 by the second lens group 36. Ghost light reflected from the planar surface 35d of the RSLM 35 returns to the light source 31 via the illumination-light aperture 43A, and thus does not reach the screen 37. As a result, an image of excellent contrast is obtained on the screen 37.

Since the illumination optical system of FIG. 9 is coaxial with the projection optical system, the construction of the overall apparatus is simplified, and mounting and adjustment of the various optical components of these systems are simplified.

The number, shape, and arrangement of the orifices 43D and the illumination-light aperture 43A shown in FIG. 10 (and of corresponding features shown in FIG. 8) are provided as examples only. The manner in which to appropriately modify these features depends upon the pattern of modulated diffracted signal light from the RSLM 35.

It will be understood that the light paths shown in FIG. 9 may be bent by a prism or mirror without destroying the overall coaxiality of the apparatus. For example, a prism can be placed in the light path between the light source 31 and the illumination-light aperture 43A so as to direct the illumination-light flux from a direction intersecting the axis AX into the illumination-light aperture 43A.

Furthermore, when a projection apparatus according to the present invention utilizing an RSLM as shown, e.g., in FIG. 4 or FIG. 6, is employed for full-color projection, a separate RSLM will generally be used for each of red (R), green (G), and blue (B) light. In such a case, the patterns of diffracted signal light that form at the pupil (i.e., at the exit-side apertures 43B) of the first lens group will differ slightly for each basic color (R, G, and B) of light. Hence, the light of each basic color that passes through the exit-side aperture 43B can be controlled relative to the light of the other basic colors by appropriately selecting the shape and arrangement of the various orifices of the exit-side aperture 43B. For example, it is possible to adjust the color balance and control color purity, etc., of the image on the screen in such a manner.

Notwithstanding the embodiments shown, for example, in FIGS. 7 and 9 in which the light source 31 supplies a nearly parallel illumination light, projection apparatus according to the present invention are not so limited. The light source can supply, e.g., divergent light by an appropriate modification of its optically conjugate relationship with the screen.

In addition, although the embodiments of FIGS. 7 and 9 employ a reflector-type light source, any other suitable type of light source may be used.

Another general type of RSLM in accordance with the present invention that can direct signal light in a different direction than ghost light has a light-modulation layer superposed on a reflective surface provided with a "microfaceted" reflective array. The microfaceted reflective array is an ordered regular array of multiple tiny reflective facets that individually are not parallel to the plane of the RSLM. As a result, ghost light and signal light from such an RSLM converge at different locations, making it possible to pass only signal light through an exit-side aperture(s) while blocking ghost light. With such RSLMs, even though incident light can enter the RSLM perpendicularly (I.e., normal) to the plane of the RSLM, the signal light exits the RSLM at an angle to the normal. This allows, with a projection apparatus employing such an RSLM, the illumination optical system and the projection optical system of the apparatus to be coaxial. Example embodiments of such RSLMs are discussed below.

Figure 11:
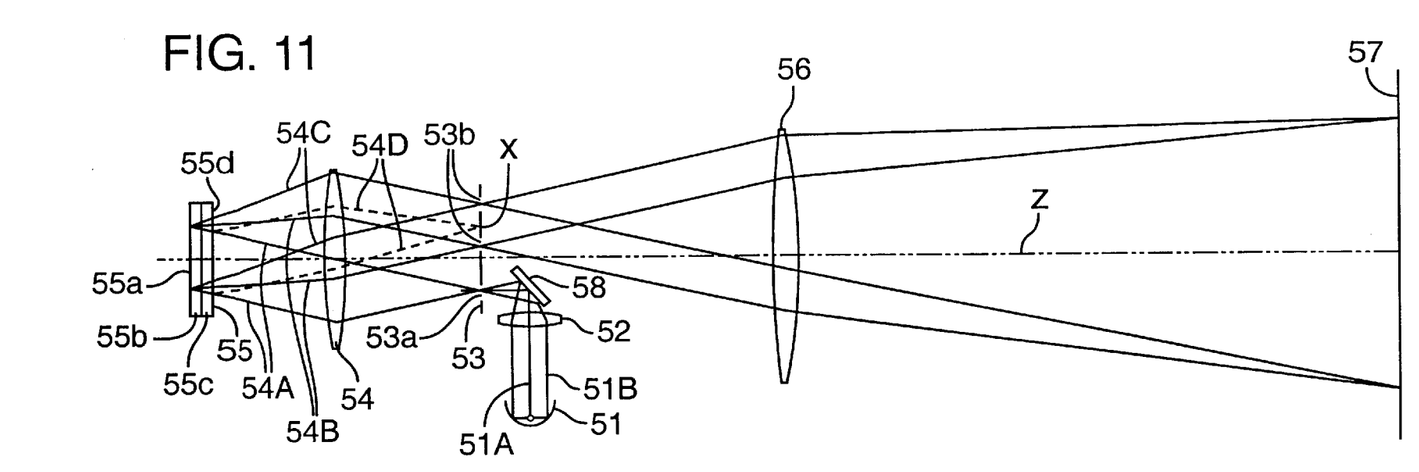
FIG. 11 is a schematic optical diagram showing general features of various embodiments of a projection apparatus according to the present invention utilizing an RSLM provided with a reflective surface having a microfaceted reflective array, wherein the projection apparatus comprises an illumination optical system and a projection optical system that are not coaxial.

FIG. 11 shows a third representative embodiment of a projection apparatus according to this invention. The FIG. 11 embodiment utilizes an RSLM 55 provided with a microfaceted reflective array. A parallel incident light flux 51B generated by a light source 51 is converged by an illumination lens 52 and an illumination prism 58 at a location on an illumination axis 51A corresponding to the incident-side aperture 53a. Light that has passed through the incident-side aperture 53a is refracted into a parallel incident light flux (rays 54A) by a front lens 54 for impingement on the RSLM 55. Light that has been modulated by the RSLM 55 (rays 54B, 54C) is converged by the front lens 54 at locations corresponding to the exit-side apertures 53b, and is projected by the rear lens 56 onto the screen 57. Ghost light (rays 54D) reflected from the surface 55d propagates in a different direction from the signal light and is effectively blocked at the point x on the stop 53.

Figure 12:
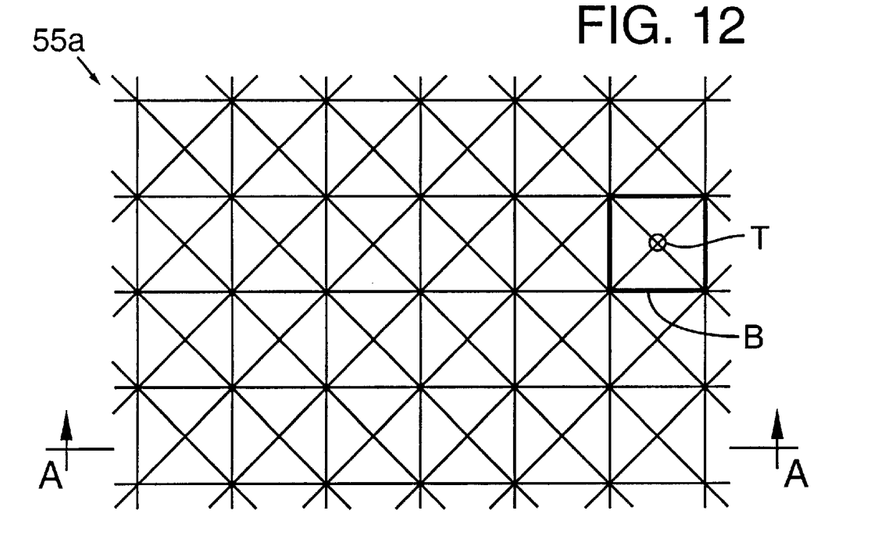
FIG. 12 is a schematic plan view of the reflective surface of an RSLM according to the present invention that can be employed in the FIG. 11 or FIG. 15 embodiment of a projection apparatus, the RSLM having a first example embodiment of a microfaceted reflective array on the reflective surface of the RSLM.
Figure 13:
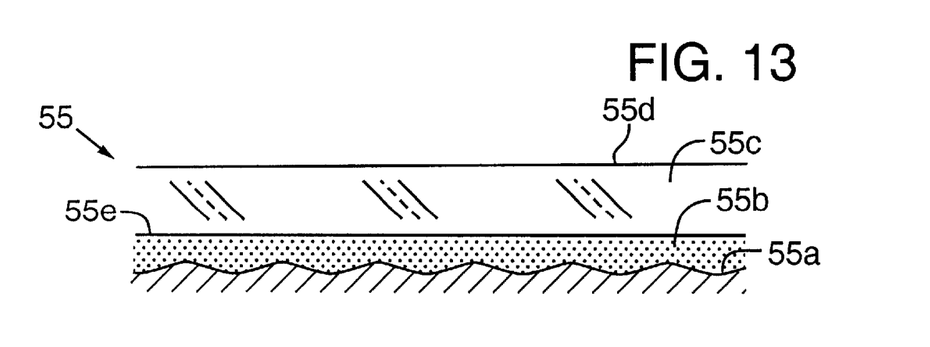
FIG. 13 is a schematic depiction of section A—A of FIG. 12.

The RSLM 55, detailed in FIG. 12 and FIG. 13, comprises a light-modulation layer 55b made from polymer dispersion-type liquid crystal, a reflective surface 55a, and a plane-parallel glass layer 55c with a planar surface 55d. Any of various additional functional films (not shown), such as a photoconductive layer, a transparent conductor (ITO) film, a light-shield layer, or an anti-reflective film can also be included as necessary or desired.

The reflective surface 55a comprises a "microfaceted reflective array." In the embodiment shown in FIG. 12, the microfaceted reflective array comprises a regular array of multiple tiny four-sided pyramids of low elevation. The sides (facets) B of each pyramid are arranged symmetrically around an apex T. As can be readily understood from FIGS. 12 and 13, the plane represented by a facet B is not parallel to the surface 55d (wherein the surface 55d is parallel to the "plane" of the RSLM).

Figure 14:
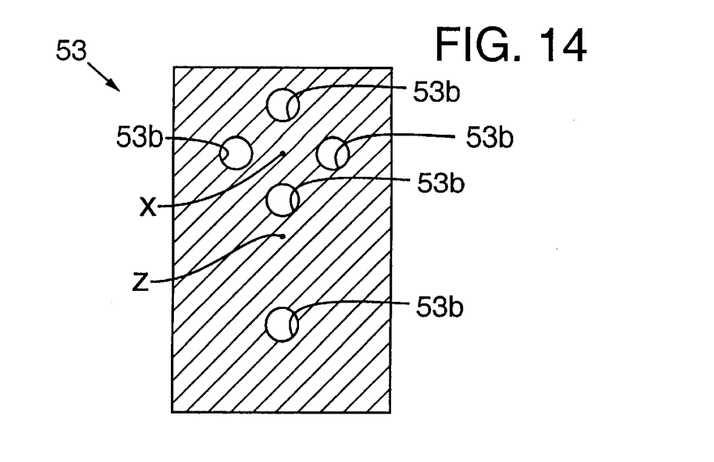
FIG. 14 is a plan view of the stop employed in the FIG. 11 embodiment of a projection apparatus that includes the RSLM of FIG. 12.

As shown in FIG. 14, the stop 53 defines one incident-side aperture 53a and usually plural exit-side apertures 53b (preferably four exit-side apertures when the RSLM used with the apparatus is as shown in FIGS. 12–13). The exit-side apertures 53b are situated so as to pass modulated light reflected from the facets B on the reflective surface 55a. The location x, around which the exit-side apertures 53b are symmetrically arranged, is where ghost light is blocked. The location z is where the optical axis Z passes through the stop 53.

The ghost light that converges at x is reflected by the planar surface 55d of the transparent layer 55c and/or the planar interface 55e (parallel to the surface 55d) between the transparent layer 55c and the light-modulation layer 55b. As shown in FIG. 14, the location x and the incident-side aperture 53a are symmetrically arranged relative to the optical axis Z. Signal light, reflected from the facets on the reflective surface 55a, has passed at least twice through the light-modulation layer 55b, and thus has been modulated by the state of the liquid-crystal material comprising the layer 55b. Because the plane of any facet B is not parallel to the surface 55d or interface 55e, signal light propagates in directions that are different from the propagation direction of ghost light. Thus, signal light converges at the exit-side apertures 53b and passes therethrough to form a high-contrast image on the screen 57, while ghost light is blocked by the stop 53 at location x.

Figure 15:
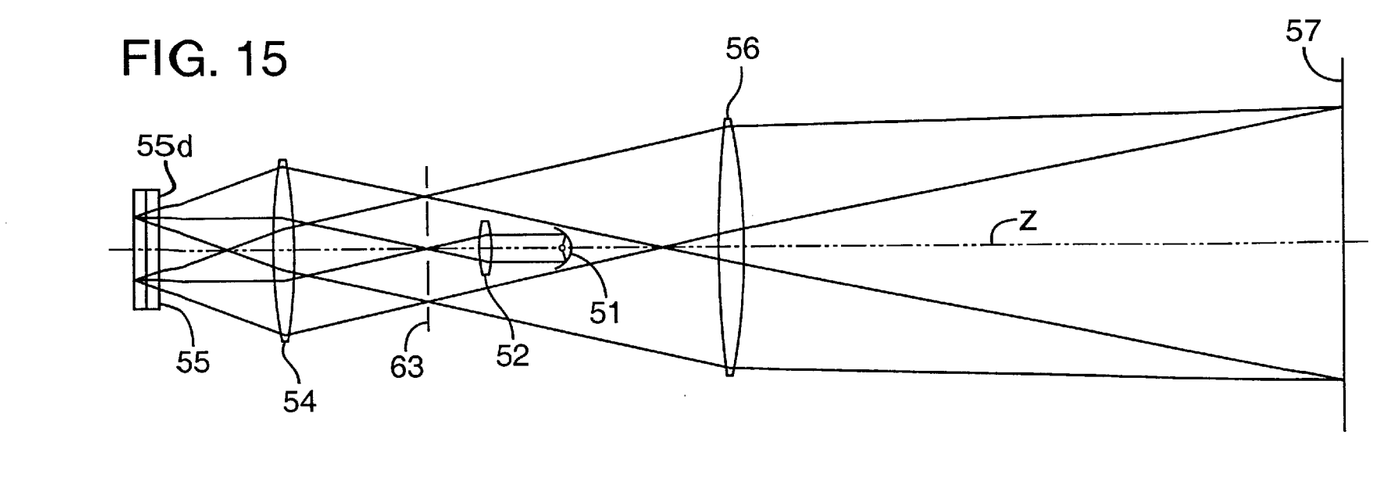
FIG. 15 is a schematic optical diagram showing general features of various embodiments of a projection apparatus according to the present invention utilizing an RSLM provided with a reflective surface having a microfaceted reflective array, wherein the projection apparatus comprises an illumination optical system and a projection optical system that are coaxial.
Figure 16:
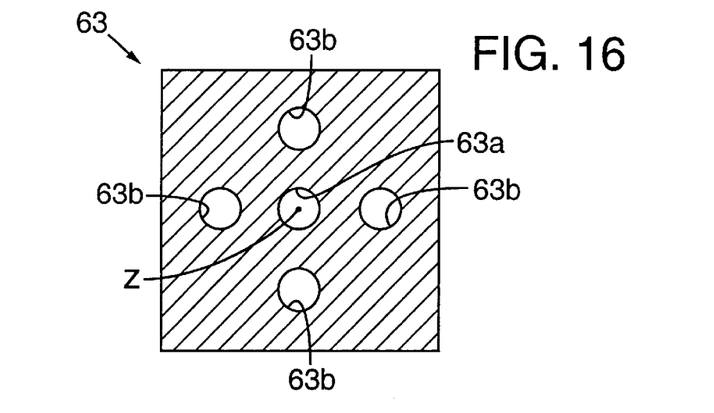
FIG. 16 is a plan view of the stop employed in the FIG. 15 embodiment of a projection apparatus that includes the RSLM of FIG. 12.

A fourth representative embodiment of a projection apparatus according to the present invention is shown in FIG. 15 which can utilize an RSLM having a microfaceted reflective array (such as shown in FIGS. 12-13). In contrast to the FIG. 11 embodiment (which is asymmetric about the optical axis z), the FIG. 15 embodiment has a structure that is symmetric around the light axis Z (i.e.; the illumination optical system of the FIG. 15 apparatus is coaxial with the projection optical system). Further with respect to the FIG. 15 embodiment, the stop 63 (detailed in FIG. 16), defines an incident-side aperture 63a situated on the light axis Z and usually plural (preferably four whenever the RSLM is as shown in FIGS. 12-13) exit-side apertures 63b situated equidistantly apart from one another symmetrically about the axis z. Since ghost light reflected by the planar surface 55d of the RSLM 55 returns again to the light source 51, the ghost light is effectively blocked from the screen 57.

In prior-art RSLMs exploiting scattering, separating scattered light from direct light (signal light) required that incident light impinge the RSLM at an angle to the normal of the plane of the RSLM (e.g., the plane represented by the planar surface of the transparent layer). In an RSLM according to the present invention as shown in FIG. 12, in contrast, a normal to any facet B is not parallel to the normal of the plane of the RSLM. It is thus possible with the RSLM of FIG. 12 for incident light to impinge the RSLM normal to the plane of the RSLM while signal light propagates in a non-normal direction.

Figure 17:
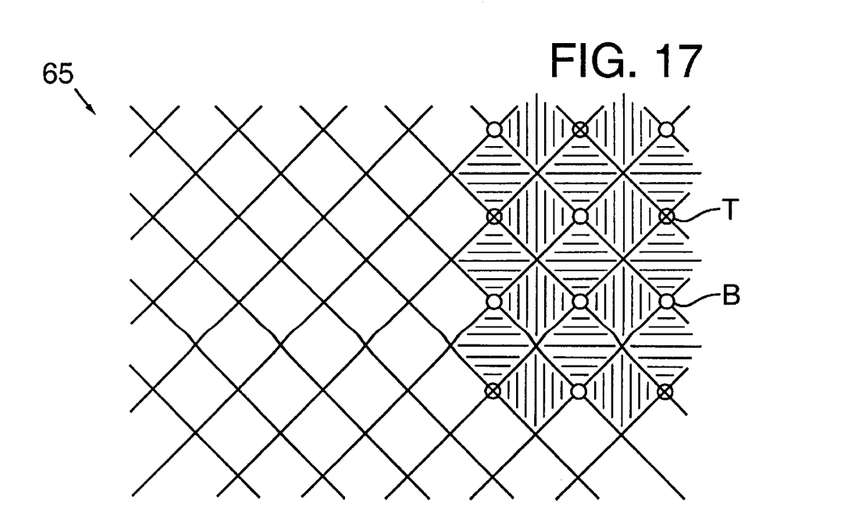
FIG. 17 is a schematic plan view of the reflective surface of an RSLM according to the present invention that can be employed in the FIG. 11 or FIG. 15 embodiment of a projection apparatus, the RSLM having a second example embodiment of a microfaceted reflective array on the reflective surface of the RSLM.

Even though the reflective surface 55a of the specific RSLM shown in FIGS. 12-13 comprises multiple convex four-sided pyramids, the surface 55a can also comprise multiple concave four-sided pyramids, or an alternating pattern of convex and concave four-sided pyramids (e.g., in a checkerboard pattern), as shown in FIG. 17. In FIG. 17, T denotes the convex apex of a representative convex pyramid and B denotes the concave apex of a representative concave pyramid.

Figure 18:
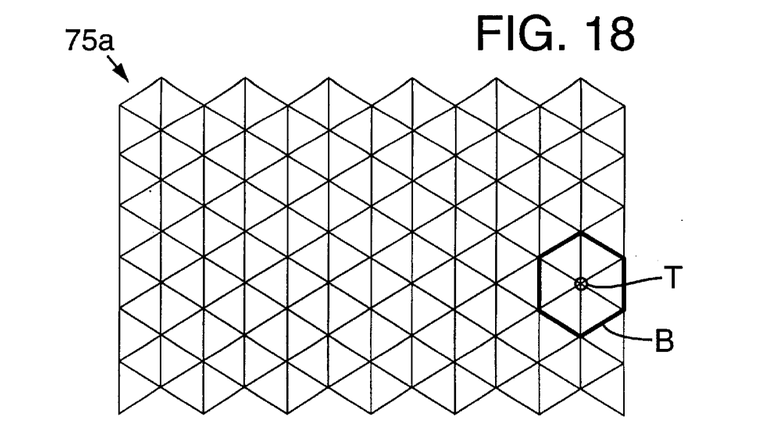
FIG. 18 is a schematic plan view of the reflective surface of an RSLM that can be employed in the FIG. 11 or FIG. 15 embodiment of a projection apparatus, the RSLM having a third example embodiment of a microfaceted reflective array on the reflective surface of the RSLM.

FIG. 18 depicts yet another example embodiment of an RSLM according to the present invention, in which the reflective surface 75a comprises a regular array of multiple six-sided pyramids collectively comprising a microfaceted reflective array. Each pyramid has an apex T of low elevation, and six facets B symmetrically surrounding each apex T. The pyramids can be convex or concave.

Figure 19A:
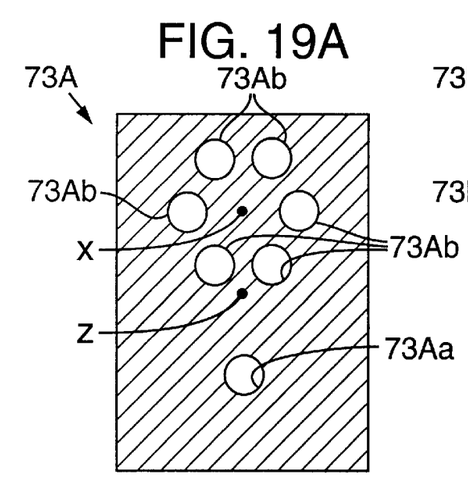
FIG. 19A is a plan view of the stop employed in the FIG. 11 embodiment of a projection apparatus that includes the RSLM of FIG. 18.

The FIG. 18 embodiment of an RSLM can be employed in any of various projection apparatus according to the present invention, such as shown generally, e.g., in FIG. 11 or FIG. 15. FIG. 19A details the stop 73A used with a projection apparatus shown generally in FIG. 11 employing the FIG. 18 RSLM embodiment (when using the FIG. 18 RSLM, the stop 73A replaces the stop 53 in FIG. 11). The stop 73A is configured similarly to the stop 53 (FIG. 14), except that the stop 73A defines six exit-side apertures 73Ab, which are symmetrical around the position x, rather than four exit-side apertures shown in FIG. 14. The six exit-side apertures 73Ab in FIG. 19A correspond to the six facets B of the pyramids in FIG. 18, whereas the four apertures 53b correspond to the four facets of each pyramid in FIG. 12. Only a single incident-side aperture 73Aa is required in the stop 73A (FIG. 19a) as in the stop 53 (FIG. 14).

Figure 19B:
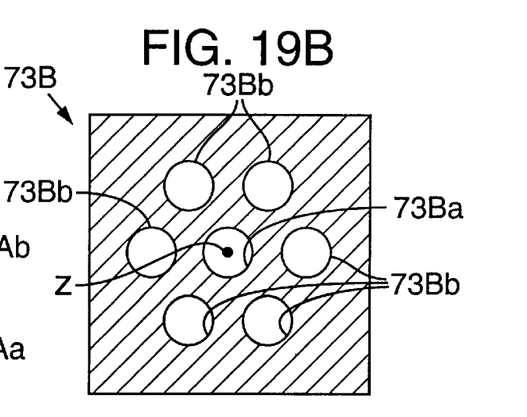
FIG. 19B is a plan view of the stop employed in the FIG. 15 embodiment of a projection apparatus that includes the RSLM of FIG. 18.

Whenever the FIG. 18 embodiment of an RSLM is employed with a projection apparatus as shown generally in FIG. 15, a stop 73B is used as detailed in FIG. 19B. The stop 73B is configured similarly to the stop 63 (FIG. 16), except that the stop 73B defines six exit-side apertures 73B*b*, which are symmetric around the incident-side aperture 73B*a*, rather than four exit-side apertures shown in FIG. 16.

Figure 20:
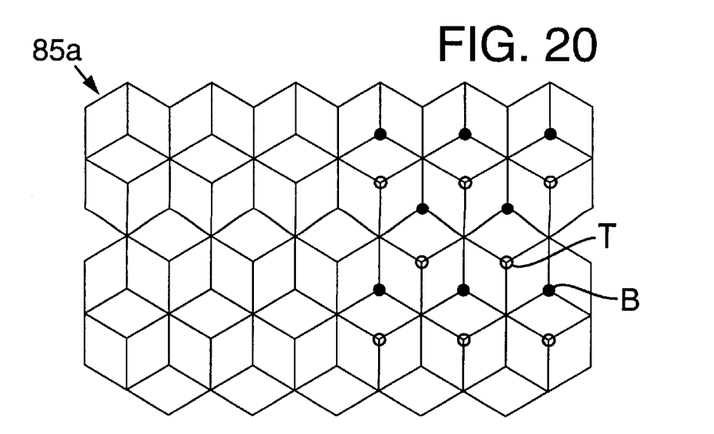
FIG. 20 is a schematic plan view of the reflective surface of an RSLM according to the present invention that can be employed in the FIG. 11 or FIG. 15 embodiment of a projection apparatus, the RSLM having a fourth example embodiment of a microfaceted reflective array on the reflective surface of the RSLM.

FIG. 20 depicts yet another example embodiment of an RSLM according to the present invention, in which the reflective surface 85*a* comprises multiple three-sided pyramids collectively comprising a microfaceted reflective array. The pyramids are both concave and convex alternately arranged, wherein T denotes a convex apex and B denotes a concave apex.

Figure 21A:
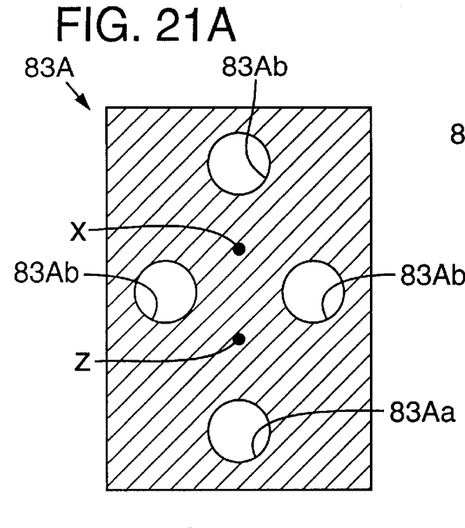
FIG. 21A is a plan view of the stop employed in the FIG. 11 embodiment of a projection apparatus that includes the RSLM of FIG. 20.

The FIG. 20 embodiment of an RSLM can be employed in a projection apparatus according to the present invention as depicted generally in, e.g., FIG. 11 or FIG. 15. FIG. 21A details a stop 83A used with a projection apparatus shown generally in FIG. 11 employing the RSLM of FIG. 20 (when using the FIG. 20 RSLM, the stop 83A replaces the stop 53 in FIG. 11). The stop 83A is configured similarly to the stop 53 (FIG. 14), except that the stop 8A defines three exit-side apertures 83A*b*, which are symmetrical around the position x, rather than four exit-side apertures shown in FIG. 14. (The three apertures 83A*b* correspond to the three facets of each pyramid shown in FIG. 20.) Only a single incident-side aperture 83A*a* is required in the stop 83A.

Figure 21B:
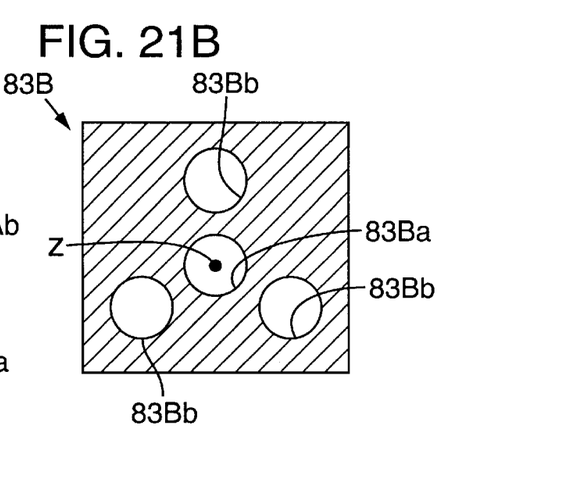
FIG. 21B is a plan view of the stop employed in the FIG. 15 embodiment of a projection apparatus that includes the RSLM of FIG. 20.

Whenever the FIG. 20 embodiment of an RSLM is employed with a projection apparatus as shown generally in FIG. 15, a stop 83B is used, as detailed in FIG. 21B. The stop 83B is configured similarly to the stop 63 (FIG. 16), except that the stop 83B defines three exit-side apertures 83B*b*, which are symmetrical around the incident-side aperture 83B*a*, rather than four exit-side apertures shown in FIG. 16.

Figure 22:
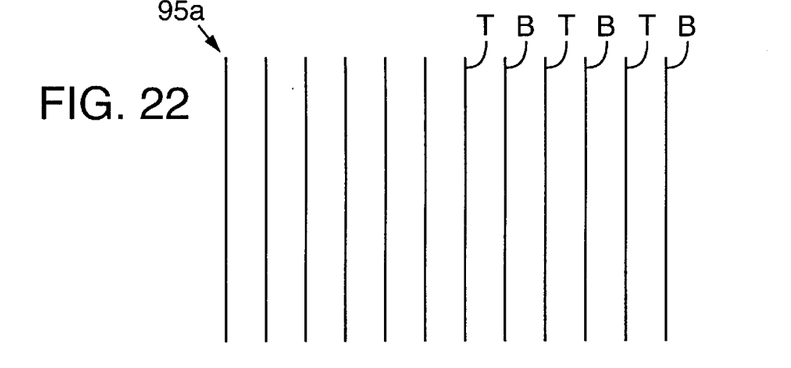
FIG. 22 is a schematic plan view of the reflective surface of an RSLM according to the present invention that can be employed in the FIG. 11 or FIG. 15 embodiment of a projection apparatus, the RSLM having a fifth example embodiment of a microfaceted reflective array on the reflective surface of the RSLM.

FIG. 22 depicts yet another example embodiment of an RSLM according to the present invention, in which the reflective surface 95*a* comprises multiple, alternately disposed parallel ridges T and valleys B collectively comprising a microfaceted reflective array.

Figure 23A:
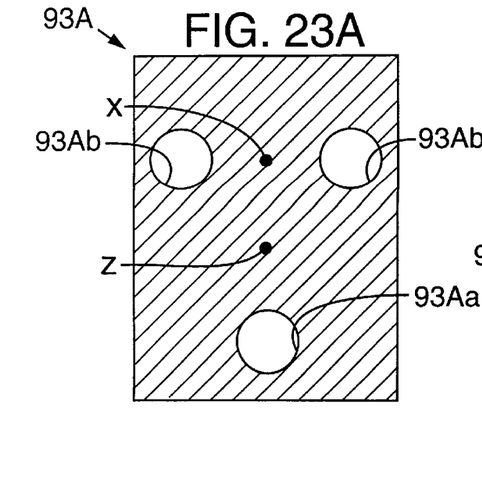
FIG. 23A is a plan view of the stop employed in the FIG. 11 embodiment of a projection apparatus that includes the RSLM of FIG. 22.

The FIG. 22 embodiment of an RSLM can be employed in a projection apparatus according to the present invention as depicted generally in, e.g., FIG. 11 or FIG. 15. FIG. 23A details a stop 93A used with a projection apparatus shown generally in FIG. 11 employing the RSLM of FIG. 22 (when the FIG. 22 RSLM is used, the stop 93A replaces the stop 53 in FIG. 11). The stop 93A is configured similarly to the stop 53 (FIG. 14), except that the stop 93A defines two exit-sided apertures 93A*b*, which are symmetrical around the position x, rather than four exit-side apertures shown in FIG. 14. (The two apertures 93A*b* correspond to the two longitudinal facets defined by each valley and ridge shown in FIG. 20.) only a single incident-side aperture 93A*a* is required in the stop 93A.

Figure 23B:
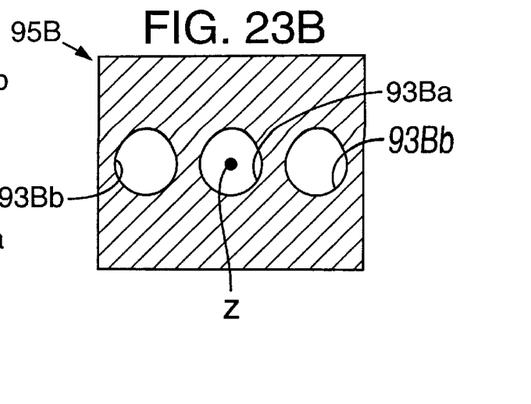
FIG. 23B is a plan view of the stop employed in the FIG. 15 embodiment of a projection apparatus that includes the RSLM of FIG. 22.

Whenever the FIG. 22 embodiment of an RSLM is employed with a projection apparatus as shown generally in FIG. 15, a stop 93B is used, as detailed in FIG. 23B. The stop 93B is configured similarly to the stop 63 (FIG. 16), except that the stop 93B defines two exit-side apertures 93B*b*, which are symmetrical around the incident-side aperture 93B*a*, rather than four exit-side apertures shown in FIG. 16.

Figure 24:
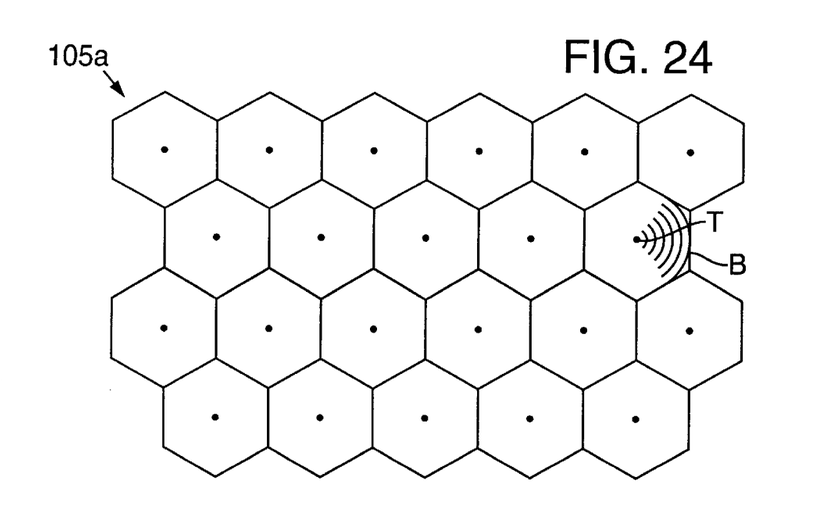
FIG. 24 is a schematic plan view of the reflective surface of an RSLM according to the present invention that can be employed in the FIG. 11 or FIG. 15 embodiment of a projection apparatus, the RSLM having a sixth example embodiment of a microfaceted reflective array on the reflective surface of the RSLM.

FIG. 24 depicts yet another example embodiment of an RSLM according to the present invention, in which the reflective surface 105*a* comprises multiple convex cones, or alternately concave cones, that collectively comprise a microfaceted reflective array. T denotes an apex (convex or concave, respectively) of a cone. Although a cone is not a planar facet, the conical surface is still functionally regarded as a facet herein.

Figure 25A:
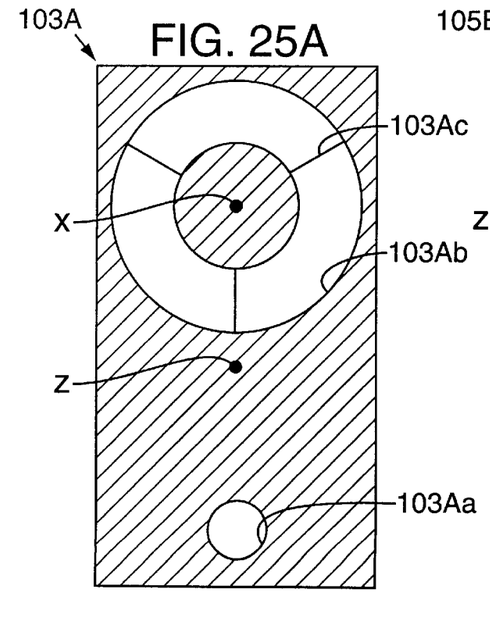
FIG. 25A is a plan view of the stop employed in the FIG. 11 embodiment of a projection apparatus that includes the RSLM of FIG. 24.

The FIG. 24 embodiment of an RSLM can be employed in a projection apparatus according to the present invention depicted generally in, e.g., FIG. 11 or FIG. 15. FIG. 25A details a stop 103A used with a projection apparatus as shown generally in FIG. 11, employing the RSLM of FIG. 24 (when the FIG. 24 RSLM is used, the stop 103A replaces the stop 53 in FIG. 11). The stop 103A is configured similarly to the stop 53 (FIG. 14), except that the stop 103A defines an annular exit-side aperture 103A*b*, which is symmetrical around the position x, rather than four exit-side apertures shown in FIG. 14. (The annular aperture 103A*b* corresponds to the conical "facets" shown in FIG. 24.) As in FIG. 14, the stop 103A has a single incident-side aperture 103A*a*.

Figure 25B:
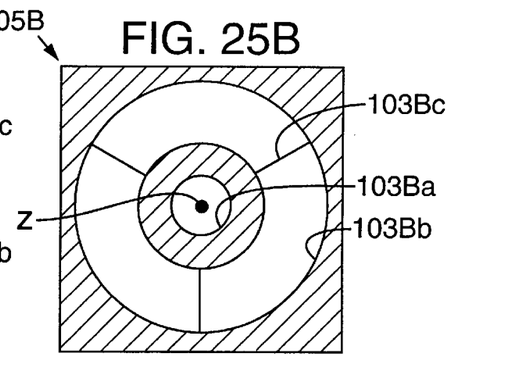
FIG. 25B is a plan view of the stop employed in the FIG. 15 embodiment of a projection apparatus that includes the RSLM of FIG. 24.

Whenever the FIG. 24 embodiment of an RSLM is employed with a projection apparatus as shown generally in FIG. 15, a stop 103B is used, as detailed in FIG. 25B. The stop 103B is configured similarly to the stop 63 (FIG. 16), except that the stop 103B defines an annular exit-side aperture 103B*b*, which is symmetrical around the incident-side aperture 103B*a*, rather than four exit-side apertures shown in FIG. 16.

In FIGS. 25A and 25B support members 103A*c*, 103B*c*, respectively, are used to support the central light shielding areas 104, 105 in the exit-side apertures 103A*b*, 103B*b*, respectively. However, the support members 103A*c*, 103B*c*, respectively, are not necessary if the stops 103A, 103B, respectively, are constructed so that the light shielding area 104, 105 is formed on a transparent material spanning the exit-side aperture 103A*b*, 103B*b*, respectively, having a thickness that will not impart any undesired optical aberration or other image-degrading effect.

In a projection apparatus according to FIG. 11 employing an RSLM according to FIG. 12, 17, 18, 20, or 22, wherein the illumination optical system and the projection optical system are not coaxial with respect to each other, it is necessary to accurately align the stop relative to the light axis Z. It is also necessary in such an apparatus to accurately align the RSLM with respect to the light axis Z and the stop.

In a projection apparatus according to FIG. 15 employing an RSLM according to FIG. 12, 17, 18, 20, or 22, wherein the illumination optical system and the projection optical system are coaxial, the stop can have any of various orientations relative to the light axis Z. However, it is necessary to accurately align the orientation of the stop with the orientation of the RSLM.

In a projection apparatus according to FIG. 11 employing an RSLM according to FIG. 24, wherein the illumination optical system and the projection optical system are not coaxial, it is necessary to accurately align the stop 103A relative to the light axis Z. However, the RSLM 105 can have any of various orientations.

In a projection apparatus according to FIG. 15 employing an RSLM according to FIG. 24, wherein the illumination optical system and the projection optical system are coaxial, the stop 103B can have any of various orientations relative to the light axis Z. Also, the RSLM 105 can have any of various orientations, which is very convenient.

The light source in a projection apparatus according to the present invention is not limited to light sources that produce a substantially parallel light flux, as were used in the example implementations described above. Any of various divergent types of the light sources can be satisfactorily employed by modifying the conjugate relationship of the light source with the surface being illuminated. Also, the configuration of the light source is not limited to the reflector type indicated in the figures. Other types can satisfactorily be used, and rod or fly-eye lenses can also be used in the illumination optical system to improve irradiance uniformity.

According to this invention, as described above, image-contrast degradation due to ghost light from the surface of an RSLM can be prevented in a projection apparatus employing an RSLM. Furthermore, the construction of the projection apparatus can be simplified compared to prior-art apparatus.

The various embodiments described herein are intended, in any case, to clarify the technical content of this invention. This invention should not be narrowly interpreted as being limited to these embodiments; this invention encompasses any of various modifications falling within the spirit of the invention and within the scope of the following claims.

What is claimed is:

1. A projection apparatus, comprising:
   (a) an illumination optical system operable to provide an illumination light flux;
   (b) a reflective spatial light modulator positioned to receive the illumination light flux, the reflection spatial light modulator comprising a reflective surface, a light-modulation layer superposed on the reflective surface, the light-modulation layer being operable to produce a signal light from incident light impinging on the reflective spatial light modulator, the signal light being propagated by the reflective spatial light modulator in a direction sufficiently different from any ghost light reflected from the reflective spatial light modulator so as to allow the ghost light to be blocked relative to the signal light;
   (c) a stop defining an aperture, the stop being positioned so as to allow passage through the aperture of the signal light propagated by the reflection spatial light modulator, but not the ghost light; and
   (d) a reflective diffraction optical element situated on the reflective surface of the reflective spatial light modulator, wherein the reflective diffraction optical element comprises an array of phase shifters operable to produce higher orders of diffracted signal light that propagate from the reflective spatial light modulator in different directions than the ghost light, and to cancel zeroth-order diffracted light.

2. The projection apparatus of claim 1, wherein the reflective spatial light modulator further comprises a microfaceted reflective array on the reflective surface.

3. The projection apparatus of claim 2, wherein the microfaceted reflective array comprises a regular array of pyramids.

4. The projection apparatus of claim 2, wherein the microfaceted reflective array comprises a regular array of longitudinal valleys and ridges.

5. A projection apparatus comprising:
   (a) an illumination optical system operable to provide an illumination light flux;
   (b) a reflective spatial light modulator positioned to receive the illumination light flux, the reflection spatial light modulator comprising a reflective surface, a light-modulation layer superposed on the reflective surface, the light-modulation layer being operable to produce a signal light from incident light impinging on the reflective spatial light modulator, the signal light being propagated by the reflective spatial light modulator in a direction sufficiently different from any ghost light reflected from the reflective spatial light modulator so as to allow the ghost light to be blocked relative to the signal light;
   (c) a stop defining an aperture, the stop being positioned so as to allow passage through the aperture of the signal light propagated by the reflection spatial light modulator, but not the ghost light; and
   (d) a microfaceted reflective array on the reflective surface of the reflective spatial light modulator, the microfaceted reflective array comprising a regular array of cones.

6. A reflective spatial light modulator, comprising:
   (a) a reflective surface;
   (b) a light-modulation layer superposed on the reflective surface, the light-modulation layer being operable to modulate incident light passing through the light-modulation layer so as to produce a signal light;
   (c) a transparent layer superposed on the light-modulation layer; and
   (d) a reflective diffraction optical element on the reflective surface operable to produce higher diffraction orders of signal light and to substantially cancel zero-order signal light.

7. The reflective spatial light modulator of claim 6, operable to propagate the higher orders of signal light from the reflective spatial light modulator in directions that are sufficiently different from any ghost light reflected from the reflective spatial light modulator so as to allow the ghost light to be blocked relative to the higher orders of signal light.

8. The reflective spatial light modulator of claim 6, wherein the reflective optical element comprises phase shifters situated in a regular array on the reflective surface.

9. The reflective spatial light modulator of claim 8, wherein each phase shifter is operable to impart a phase shift of about $\lambda/2$ to light of wavelength $\lambda$ passing through the phase shifter, reflecting from the reflective surface, and returning through the phase shifter, compared to light reflecting from the reflective surface without passing through the phase shifter.

10. The reflective spatial light modulator of claim 6, wherein the reflective optical element comprises a regular array of indentations and protrusions arranged on the reflective surface, the indentations and protrusions being configured to impart a phase shift of about $\lambda/2$ to light of wavelength $\lambda$ reflecting from an indentation compared to light of wavelength $\lambda$ reflecting from a protrusion.

11. A projection apparatus comprising:
    (a) an illumination optical system operable to provide an illumination light flux;
    (b) a projection optical system operable to project a signal light flux to a viewing surface, the illumination optical system and the projection optical system being coaxial with each other; and
    (c) a reflective spatial light modulator situated relative to the illumination optical system and the projection optical system so as to produce the signal light flux from the illumination light flux impinging on the reflective spatial light modulator and to direct the signal light flux to the projection optical system, the reflective spatial light modulator (i) comprising a reflective surface and a light-modulation layer superposed on the reflective surface, and (ii) canceling signal light of a specific order by interference with light of a different phase, while directing the signal light of another order that is different from that of the specific order, to the viewing surface.

12. The projection apparatus of claim 11, wherein the illumination-light flux impinges upon the reflective spatial light modulator normal to the reflective spatial light modulator.

13. The projection apparatus of claim 11, wherein the reflective spatial light modulator comprises a reflective diffraction optical element.

14. The projection apparatus of claim 13, wherein the reflective diffraction optical element comprises phase shifters arrayed in a regular pattern on the reflective surface, each phase shifter being operable to impart a phase shift of about $\lambda/2$ to light of wavelength $\lambda$ passing through the phase shifter, reflecting from the reflective surface, and returning through the phase shifter, compared to light reflecting from the reflective surface without passing through the phase shifter.

15. The projection apparatus of claim 13, wherein the reflective diffraction optical element comprises a regular array of indentations and protrusions arranged on the reflective surface, the indentations and protrusions being configured to impart a phase shift of about $\lambda/2$ to light of wavelength $\lambda$ reflecting from an indentation compared to light of wavelength $\lambda$ reflecting from a protrusion.

16. The projection apparatus of claim 11, wherein the reflective spatial light modulator comprises a microfaceted reflective array on the reflective surface.

17. The projection apparatus of claim 11, wherein the projection optical system comprises, in order from the reflective spatial light modulator side, a first lens group, an exit-side aperture, and a second lens group.

18. The projection apparatus of claim 17, wherein the illumination optical system comprises an illumination-side aperture situated between the first lens group and the second lens group such that the illumination-light flux passes through the illumination-side aperture to be refracted by the first lens group for impingement on the reflective spatial light modulator.

19. The projection apparatus of claim 18, wherein the exit-side aperture is situated between the first lens group and the second lens group such that the signal light flux, but substantially no ghost light, passes through the exit-side aperture to be refracted by the second lens group for impingement on the viewing surface.

20. The projection apparatus of claim 19, wherein the illumination-side aperture and the exit-side aperture are defined by a stop disposed between the first and second lens groups.

21. The projection apparatus of claim 20, wherein the stop is operable to block the ghost light while allowing the signal light flux to pass through the exit-side aperture to the viewing surface.

22. The projection apparatus of claim 20, wherein the stop is operable to pass ghost light back through the illumination-side aperture rather than the exit-side aperture, thereby preventing the ghost light from reaching the viewing surface.

* * * * *